INVENTORS
PAUL E. FISCHER
WILLIAM A. HEATLEY JR.
MORRIS SORKIN
BY
*James and Franklin*
ATTORNEY

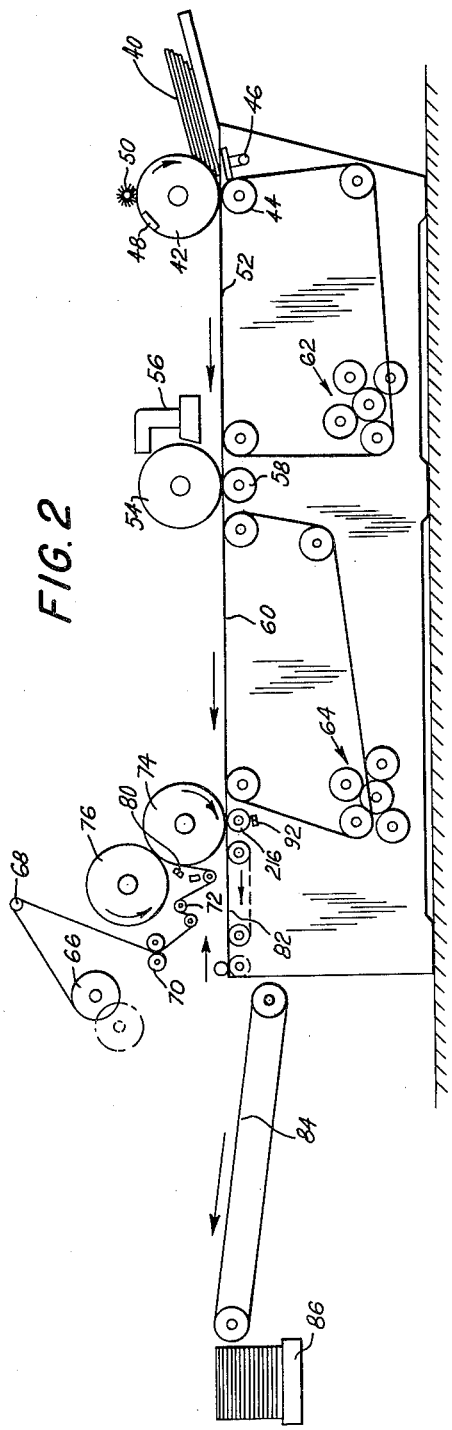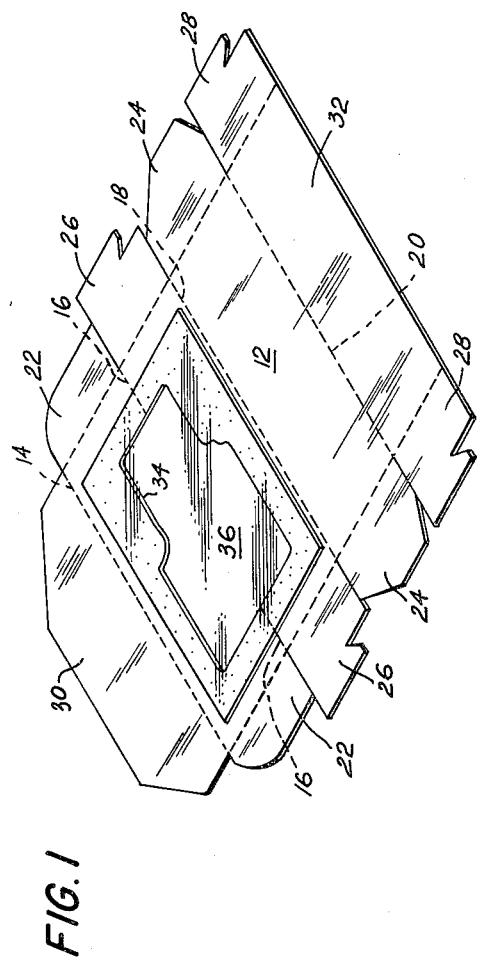

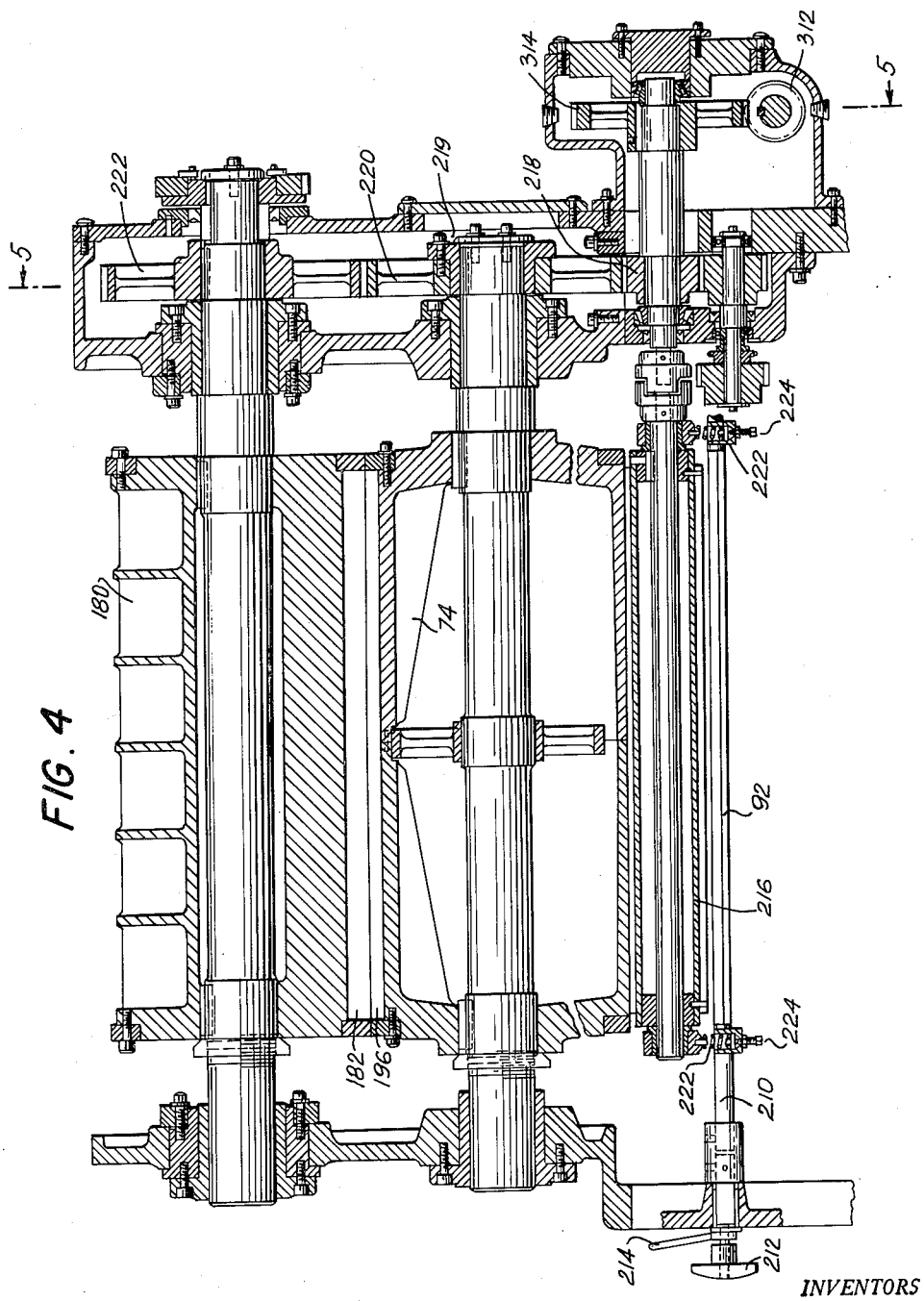

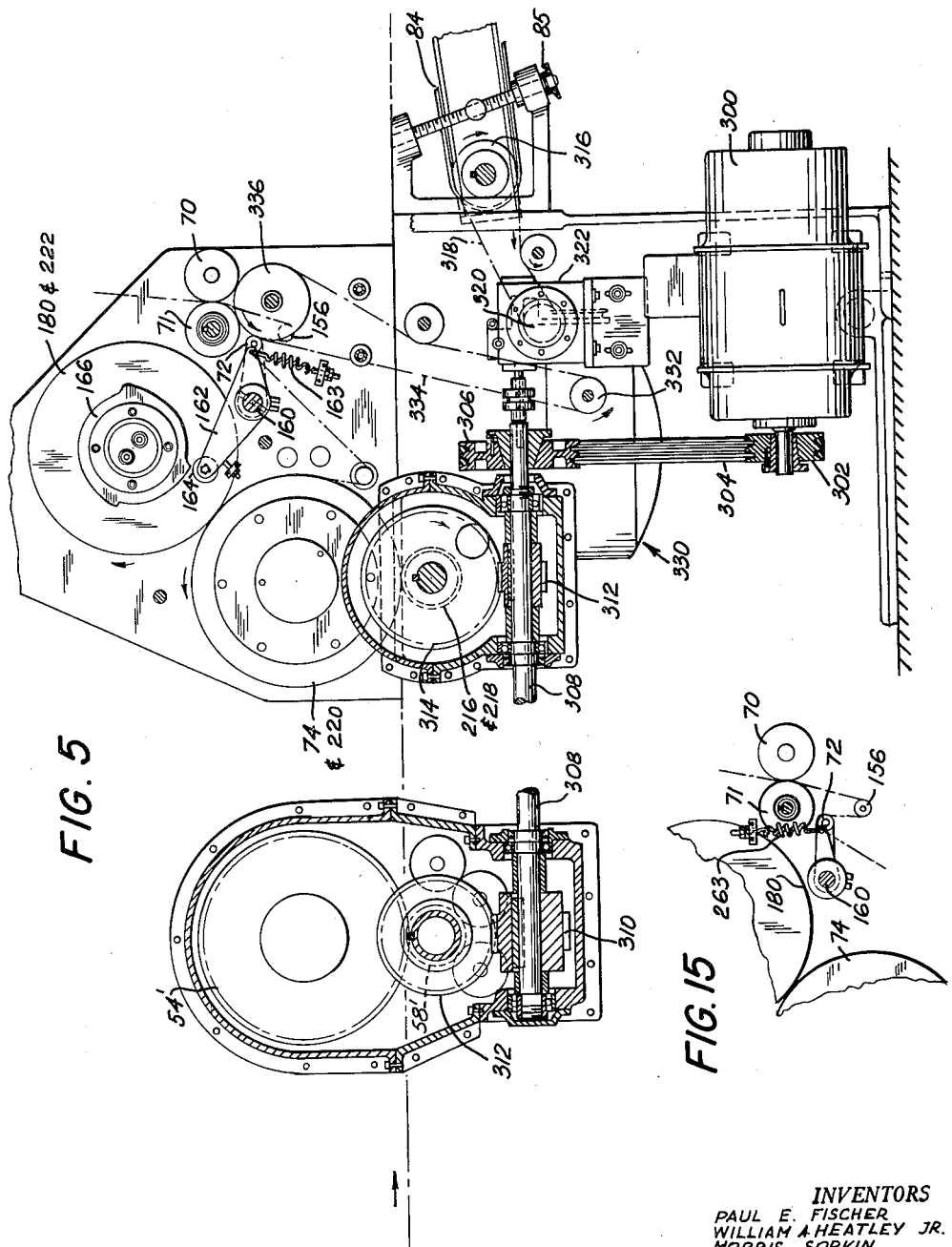

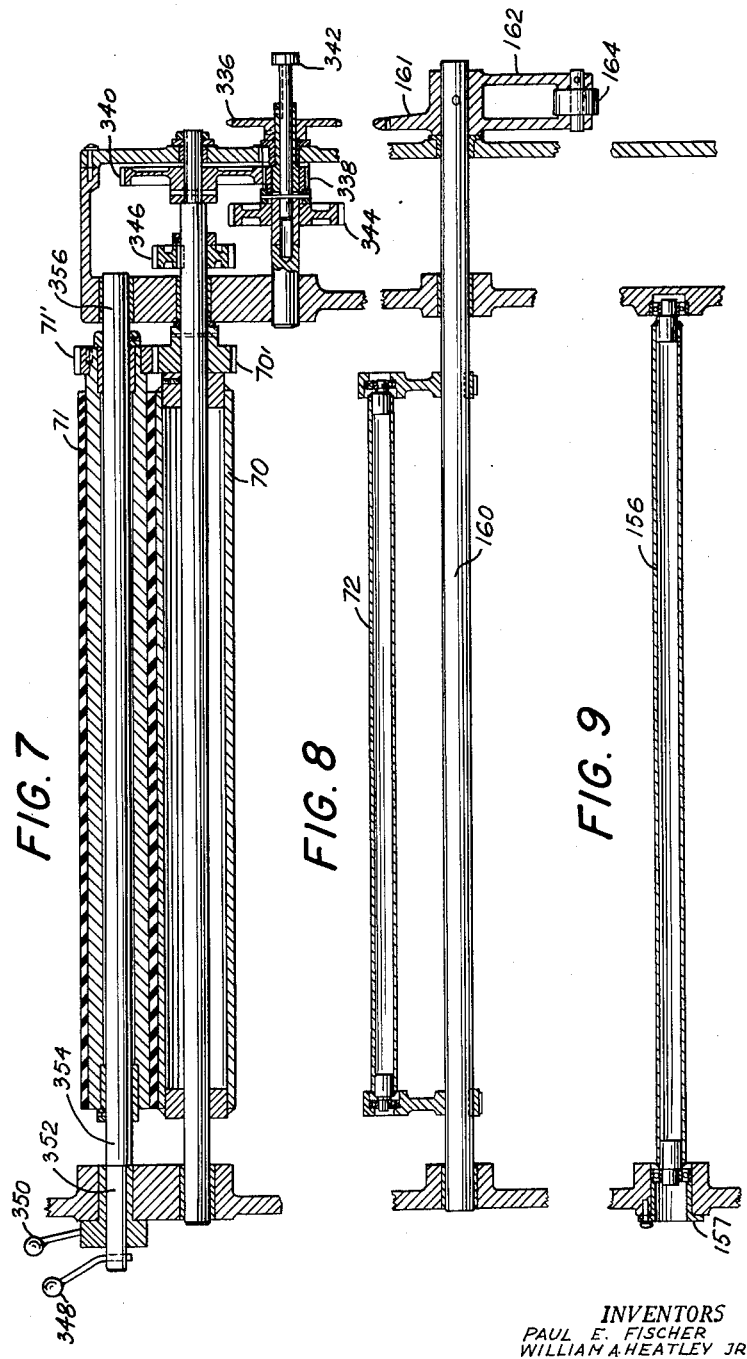

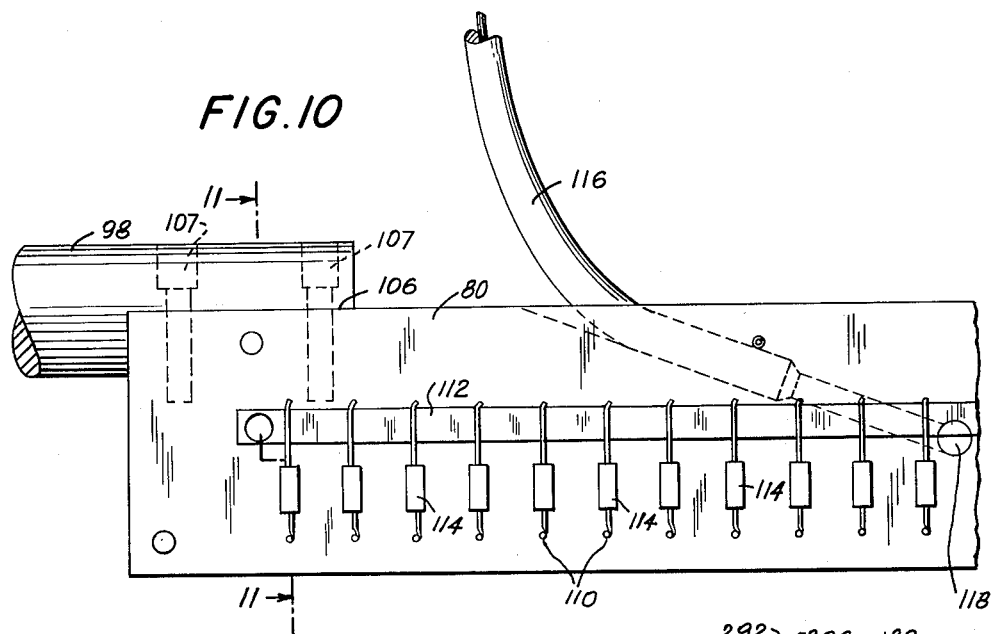
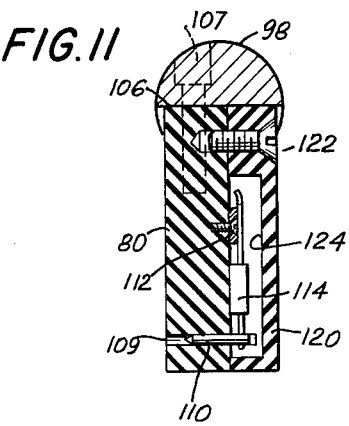
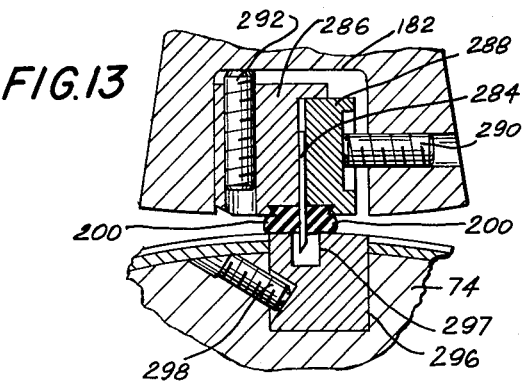
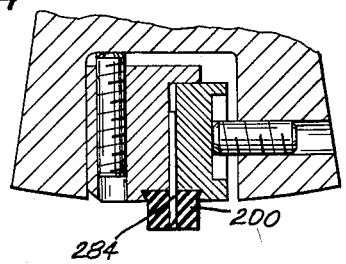
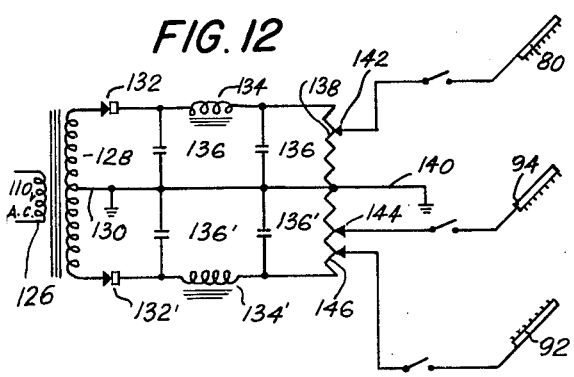

United States Patent Office 3,048,088
Patented Aug. 7, 1962

3,048,088
WINDOW APPLYING MACHINE FOR CONTAINERS
Paul E. Fischer, Cedar Grove, William A. Heatley, Jr., North Haledon, and Morris Sorkin, Bergenfield, N.J., assignors to Champlain Company, Inc., Roseland, N.J., a corporation of New York
Filed May 13, 1960, Ser. No. 28,998
13 Claims. (Cl. 93—36)

This invention relates to apparatus for applying flexible transparent windows to paper blanks.

The particular apparatus disclosed applies the windows to cardboard box blanks, but the invention is also applicable to paper envelope blanks and other related containers. The window material is a thin transparent film such as cellophane, which is difficult to handle in sheet form, and the preferred practice is to work directly from a web or roll of the transparent material. This is cut into sheets of desired dimension, and these sheets are transferred directly to the blanks to which they are cemented.

Carton blanks are conveyed through glue application means, and then through a window applying drum and roll, and then to a delivery belt. The film is fed through metering rolls to obtain the desired window length, and then around a compensator roll, from which it goes between knife and anvil drums, and then down around the latter for application to the re-glued carton blank. In prior practice the anvil drum is a vacuum drum and acts also as the window applying drum or delivery drum.

The metering rolls do not feed out film as fast as the vacuum drum takes it up. This latter is full of tiny holes leading to inner chambers which are kept under vacuum. Thus the film adheres to it, but because of the faster speed of the vacuum drum, the film continually slips on it. When the proper window length is metered out, the knife in an upper drum cuts it off against an anvil in the lower vacuum drum. At the instant of cutting the film can no longer slip and is pulled at the linear speed of the vacuum drum. This is made possible by the compensator roll which relieves the web to avoid stretching or breaking.

After cutting the compensator resets, and the severed window adheres to the drum and is carried down and around to the pre-glued carton blank in properly timed relation. At that time a valve system reverses the air flow (pressure instead of suction) through the tiny holes, which insures transfer of the window to the carton.

This vacuum drum system is workable, but it is costly and constitutes a maintenance problem. The pumps, blowers, hose, etc. must be kept in order, and the tiny holes in the drum, which may number 6000, continually fill up with paper dust, and with glue if a blank is missed, and require laborious rodding out.

The primary object of the present invention is to overcome the foregoing difficulties, and to provide improved means for causing the flexible window to adhere to the drum. For this purpose a high D.C. voltage is applied to the web at the drum in order to charge it electrostatically, so that it adheres to the drum without the use of suction and suction holes.

Another and ancillary object is to prevent backward travel of the electrostatic charge along the web, so that the web will not adhere to guide rollers or the like preceding the drum. For this purpose the charge on the web is neutralized by applying a D.C. voltage of opposite polarity thereto.

Still another object is to facilitate release of the sheet from the drum when it is delivered to the blank receiving the same. The window opening in the blank is surrounded by a line of adhesive to hold the window, and in most cases this is sufficient to separate the blank from the drum. However, if it be desired to additionally insure release and transfer of the window from the drum to the blank, another D.C. voltage of opposite polarity may be applied to the blank, or more specifically to a pressure roll provided beneath the drum for squeezing together the window and the blank. The resulting neutralization of the electrostatic charge frees the blank from the drum.

Further objects of the invention center about the means for applying the electrostatic charge to the web. In preferred form a charging bar is provided which carries a large number of pointed electrodes extending transversely of the bar. These are all connected to a bus for extending longitudinally of the bar. Another object of the invention is to prevent excessive discharge or window breakdown at any one electrode, which may rob energy from the other electrodes.

To accomplish the foregoing general objects, and other more specific objects which will hereinafter appear, the invention resides in the window applying apparatus and the elements thereof and their relation one to another, as are hereinafter more particularly described in the following specification. The specification is accompanied by drawings in which:

FIG. 1 shows a box blank to which a transparent window has been applied;

FIG. 2 is a vertical elevation schematically showing a complete apparatus for the present purpose;

Figure 3:
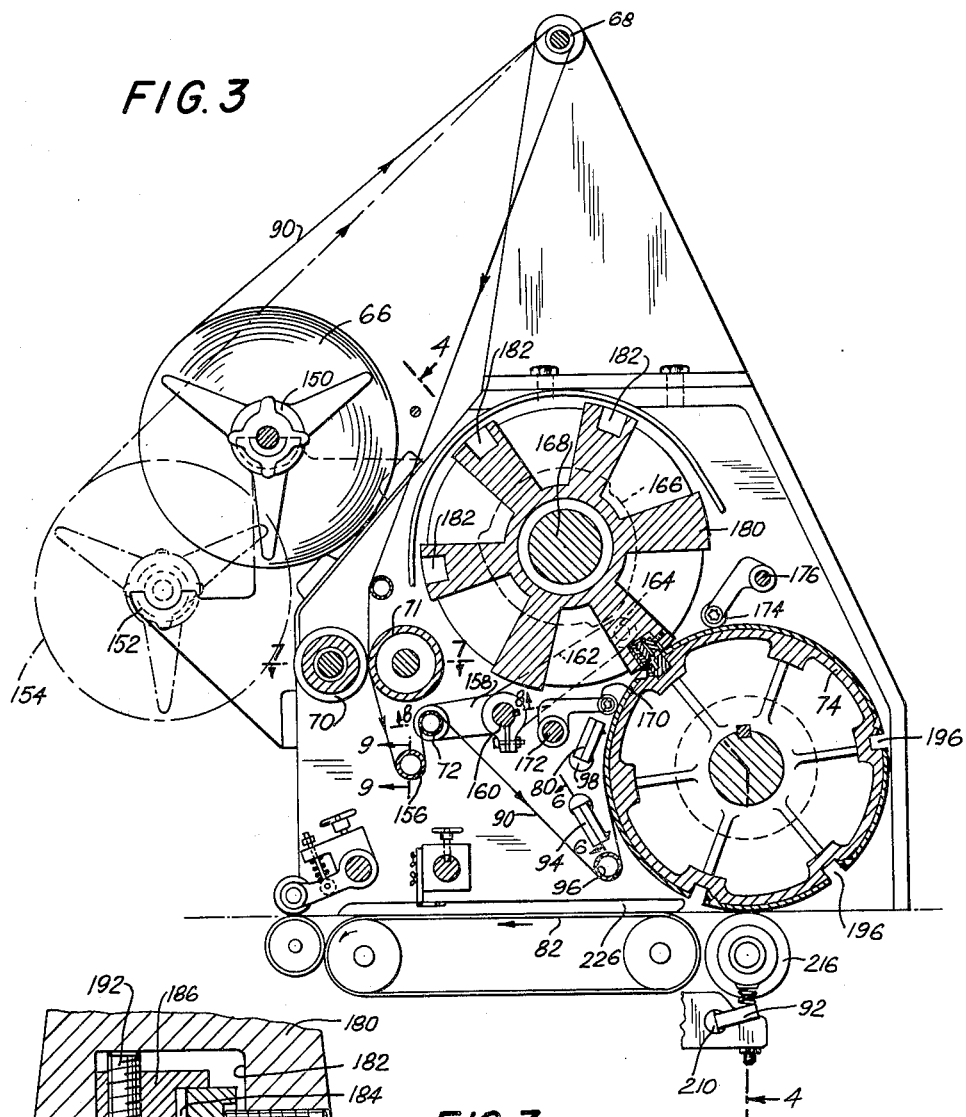
FIG. 3 is a vertical section, drawn to larger scale, through the window applying mechanism.

FIG. 3-A is a fragmentary view drawn to larger scale, and shows a detail of one form of cutting mechanism;

FIG. 4 is a section taken approximately in the plane of the line 4—4 of FIG. 3;

FIG. 5 is a partially sectioned elevation showing the drive system or gearing, and is taken approximately in the plane of the line 5—5 of FIG. 4;

FIG. 6 is explanatory of the adjustable mounting of the charging bars;

FIG. 7 is a section thru the metering rolls, and is taken approximately in the plane 7—7 of FIG. 3;

FIG. 8 is a section through the compensator roller, and is taken approximately in the plane 8—8 of FIG. 3;

FIG. 9 is a section through a direction changing roller or idler, and is taken approximately in the plane 9—9 of FIG. 3;

FIG. 10 is a fragmentary view drawn to enlarged scale and showing the interior of a charging bar after separation of the two halves of the bar;

FIG. 11 is a transverse section taken approximately in the plane of the line 11—11 of FIG. 10;

FIG. 12 is a wiring diagram explanatory of the charging circuit.

Figure 3A:
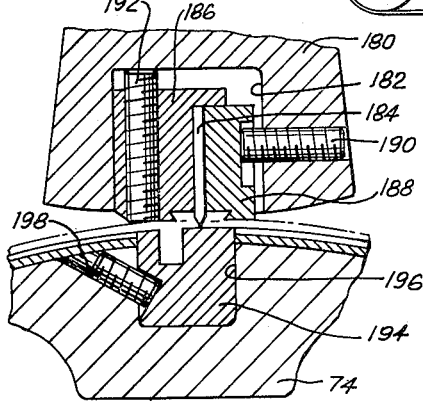

FIG. 13 is a fragmentary section like FIG. 3A but showing an improved cutting mechanism;

FIG. 14 is a similar view but shows the compression pad expanded; and

FIG. 15 is a fragmentary view like the upper right hand part of FIG. 5, but showing a modification for use with the cutter of FIG. 13.

Referring to the drawing, and more particularly to FIG. 1, the blank 12 is a cardboard carton blank which is folded on the lines 14, 16, 18, and 20 to form an elongated box which in this case is square in cross section. Flaps 22, 24 and interlocking ends 26 and 28 fold inward to provide ends for the box, while the part 30 acts as a tongue which is received inside the then upright wall 32 when the box is closed.

The blank is cut away to provide a window opening 34, and this is covered by a thin flexible transparent film 36 made of cellophane, acetate, Mylar, or other suitable material. The window 36 is adhered to the blank by a line of adhesive disposed outside the window opening 34. In the present case the window is bent on line 16 when the blank is folded, so that the contents, in this case doughnuts, are exposed on two sides of the box. It will be understood that this particular box blank is shown by way of example, rather than in limitation of the invention.

Referring now to FIG. 2 of the drawing, cartons are fed successively from a stack 40 by means of feed wheels 42, 44. The carton feed may be controlled by means of a retarding device 46. The feed drum 42 has shoes 48, and is cleaned by one or more brushes 50. The blank is fed to timing chains 52 which have pusher fingers to properly space the blanks one behind the other.

The glue line is applied to the blank by means of a glue drum 54. The glue is supplied from a glue pot 56, and the blank leaving chains 52 is supported by a pressure roll 58 as the glue is applied.

The glued blank is delivered to another set of feed chains 60. These again may have pusher fingers, and they deliver the blanks in properly spaced relation. Appropriate gear trains, including change gears indicated generally at 62 and 64, may be used to drive the chains at desired speed.

The cellophane or other transparent web is supplied from a roll 66, and runs over a guide roller 68 to metering rolls 70 which feed the web at correct average speed. The web then passes around a series of guide rollers, including a compensating roller 72, and finally is supplied to a drum 74. This cooperates with a rotary cutter 76, and one purpose of drum 74 is to carry an anvil cooperating with the cutter 76 to cut from the web a window of desired dimension. Another and main purpose of drum 74 is to transfer the severed window to a box blank running beneath the drum. Heretofore the drum 74 has been a suction-pressure drum, but in accordance with the present invention, the drum may have an imperforate surface, and the window is adhered to the drum by means of static electricity. For this purpose the web is electrically charged at the drum 74 by means of a charging bar shown at 80.

The blanks with the windows applied thereto then may travel on a small endless belt 82 which transfers the blanks to a conveyor 84. This delivers the blanks to a vertically movable tray 86, which is gradually lowered as the blanks are stacked thereon.

Referring now to FIG. 3 of the drawing, the apparatus comprises a rotating drum 74, and a charging bar 80 to apply a high D.C. voltage to the transparent web 90 at the drum. This charges the web electrostatically so that it adheres to the drum. The adhesive on the blank is usually sufficient to remove the window from the drum but if desired an additional charging bar 92 may be provided, to apply a D.C. voltage of opposite polarity at the delivery station in order to help release the window from the drum. We call this a transfer bar. A third charging bar 94 may be provided at a point further ahead of the drum than the charging bar 80. This is given a voltage of opposite polarity compared to bar 80, in order to neutralize the web against backward travel of the electrostatic charge along the web. We call this a neutralizing bar. It avoids possible difficulty in having the charged web adhere to earlier parts of the mechanism, such as the guide and compensator rollers.

Referring now to FIG. 6, charging bar 80 may be mounted on spindles 98, 99, and may be turned by an adjusting handle 100. The resulting adjustment may be locked by a locking handle 102 which is internally threaded, and threadedly engages the end portion 104 of spindle 98. The axial force reacts against collar 103.

Referring now to FIGS. 10 and 11 of the drawing, spindle 98 is cut away or flattened at 106, and the insulation bar 80 is secured thereto by means of screws indicated at 107. The bar is made of two parts (see FIG. 11). The main part 80 has a series of holes 109 receiving pointed electrodes 110 extending transversely of the bar. The points may protrude from the bar, but are preferably recessed or housed, in order to prevent scratching of the hands of an operator working around the machine. (In FIG. 3 they are shown projecting, but only for clarity of illustration.) The pointed electrodes 110 are all connected to a common bus bar 112 (FIG. 10) extending along the bar 80. A resistor of high value, say 22 megohms, is connected in series with each electrode, as indicated at 114. The main power supply passes through an insulated conductor 116, the end of which is connected at 118 to bus bar 112.

These parts are all housed in an insulation cover 120 which is secured to insulation bar 80 in face-to-face relation, as by means of screws 122. The cover 120 is channeled or hollowed at 124 to clear the resistors and bus bar.

Reverting to FIG. 3, adjustment of bar 80 on the axis of spindle 98 causes the pointed electrodes to be moved nearer to or further from the drum 74. This provides flexibility in setting up and adjusting the apparatus. The bars 92 and 94 are similarly constructed, and similarly mounted for adjustment.

The electrical circuit for energizing the charging bars may use standard power supply units. A simplified schematic of one possible circuit is shown in FIG. 12, in which the primary 126 of a step-up transformer is connected to an ordinary power line. The high voltage secondary 128 has a center connection 130 to ground. The output is rectified by rectifiers 132 and 132' which lead to filters comprising one or more inductors 134 and capacitors 136. The filter 134', 136' is similar. A potentiometer 138 facilitates voltage regulation, and this preferably is connected to ground at a center tap 140, so that voltages of opposite polarity are available relative to the machine frame and shafts, etc., which conveniently are kept at ground potential. The rectifiers may be selenium rectifiers.

A charging voltage is applied to bar 80, as previously described, and the amount of this voltage may be varied at potentiometer tap 142. In a typical case the voltage may be 15,000 volts, but the electrodes are harmless to those working around the apparatus because no significant amount of current can be drawn. The resistors may have a value of say 22 megohms.

The neutralizing bar 94 and the transfer bar 92 are energized at opposite polarity, compared to the charging bar, and for this purpose variable voltage taps are provided at 144 and 146. Thus each of the three voltages used is variable independently of the others, and the neutralizing and transfer voltages may be made opposite in polarity from the charging voltage. The voltage on the bars 92 and 94 may be about 10,000 volts, as needed, and may be determined by trial and error.

The above and subsequently given quantitative values all are given merely by way of example, and are not intended to limit the invention.

The series resistors are used to limit the current drain at any one electrode. If an electrode arcs, with penetration of the web, its current would increase greatly, with a consequent decrease at the other electrodes, and so aggravate the hole formed at the first, but resistors prevent this. They also provide safety to the operator, apart from the power supply, which preferably is made safe by use of a "high bleeder." The charge on the delivery drum is spread over a large area, and therefore there is no danger of shock on contact with the drum.

For the present purpose the surface of the drum 74 (FIG. 3) is made of insulation. As here shown, the body of the drum is made of metal, but it is provided with a coating of a suitable plastics material, in this case tetrafluoroethylene resin, such as that sold commercially under the trademark "Teflon." This has the advantage of being slippery, because the web must slip on the drum part of the time, the action being a so-called "slip-and-drag" cutting action. For convenience in applying the Teflon to the drum, the Teflon is preliminarily applied to sheet metal, and the latter is then secured to the drum. In one specific case the Teflon had a thickness of 1/32 inch and was carried by sheet metal having a thickness of 1/16 inch.

The drum coating may be Profax or nylon instead of Teflon. The material used should preferably be resistant to glue and its solvents, should be easily cleared of deposited glue, etc.; and preferably should take a high polish or be inherently slippery.

The charging bar is believed to operate as follows. The high voltage D.C. potential causes air under the bar to ionize, and the effect is such that a charge is created on the surface of the drum which is opposite in effect to that on the underside of the film, thereby causing the film to adhere to the drum. The knob adjustment shown in FIG. 6 permits the pins to come nearer to or further from the web. This adjustment is in addition to the adjustability of the voltage applied to the charging bar. Although not shown, additional charging bars may be added to cover more area, and thereby increase the adherence of the transparent film to the drum jacket. This has so far not been found necessary.

The neutralizer bar is shown at 94 in FIG. 3, and it is mounted in the same manner as is shown for the bar 80 in FIG. 6. It similarly has an adjusting knob and a lock, so that its pins may be adjusted toward or away from the web, and this adjustment is in addition to the adjustability of the voltage applied to the neutralizer bar.

The theory is believed as follows. Certain transparent films or webs are conductive enough to permit a trickle of current to flow down the film toward the preceding guide roller, which is in contact with the machine frame, and thus to ground. These films may adhere to such a grounded guide roller, and this may present operational difficulties. For some web materials the neutralizer bar is not needed at all, but in other cases it may be desirable, and it is therefore provided in the present machine for use if necessary. Being energized at a polarity opposite to that supplied to the charging bar 80, it provides a return path for any charge trickling back along the web, and so drains off the charge before it reaches the grounded guide roller.

The cutting action may be described with reference to FIG. 3. The transparent film or web 90 is taken from a roll 66. This is carried in bearings 150, and an additional set of bearings 152 is provided to support another roll indicated in broken lines at 154. This is convenient for the addition of a new roll after the old roll has run down to small diameter, and preparatory to splicing the end of the old roll to the beginning of the new roll. In effect there is a double roll stand.

The web 90 turns about a guide roller 68 and thence goes to metering rolls 70, 71. These turn at a speed which will feed out exactly the desired average amount of web, running at uniform speed. The web then turns on guide roller 156 and is led about a compensating roller 72 which is carried on arms 158 pivoted at 160. The shaft 160 is rocked by means of a cam follower arm 162 and a cam roller 164 bearing against a cam 166. This turns with the cutter shaft 168.

The web 90 continues down to another guide roller 96 and then upward to the drum 74. It is held against the drum by a roller 170 carried on arms pivoted at 172, and another roller 174 carried on arms pivoted at 176.

The cutter drum 180 may carry one, two, or three cutting blades, depending on the length of window to be severed from the web. For this purpose the drum 180 has slots 182 to receive the cutter, and it will be seen from inspection of the drawing that two of these slots are located diametrically, for use with two blades, while three are located 120 degrees apart, for use with three blades. Only one blade is shown in FIG. 3, but the use of two more is implied by the three lobes on cam 166.

Referring now to FIG. 3-A, a cutting blade 184 is secured in position between blocks 186 and 188. These are tightened by appropriate screws 190. The projection of the blade for its cutting action is adjusted by means of screws 192. An assembly of this type may be put in one or more of the slots 182.

The cutting blade 184 works against a solid anvil 194, and this is inserted in a slot 196 in the drum 74, and locked in position by screws 198.

Reverting now to FIG. 3, there are four anvil slots 196, two of which are diametrically related, and three of which are 120 degrees apart. These are for cooperation with one, two, or three cutting blades. The drums 74 and 180 have the same pitch diameter, and turn in one to one ratio. Anvils are placed in appropriate slots to mate with cutting blades carried in appropriate slots of the cutter drum 180.

In the particular machine here shown blanks may be cut having a length ranging up to 7 inches (using three cutters, up to 10½ inches (using two cutters), and up to 21 inches (using one cutter). For the longest window a single blade and anvil are used.

The metered length of web is less than the peripheral distance around the drum 74. The web therefore slips as the drum rotates, but at the instant of cutting, the web can no longer slip and must move at full drum speed. The action of the cam 166 is such that at this precise instant the compensator roller 72 is moved abruptly downward, thereby releasing the web briefly for rapid movement. When the window has been severed, the window continues to move at full speed with the drum, it being held by electrostatic attraction, as previously described, but the remaining web slips on the drum, also as previously described. Meanwhile the compensating roller returns to normal position. Three cams are supplied, one with one lobe, another with two lobes, and the third with three lobes as here shown, for use with one, two, or three cutters, respectively. The construction of the compensator roller and its cam follower is shown in FIG. 8. An arm 161 (FIG. 8) receives a pull spring 163 (FIG. 5) to hold the cam roller against the cam.

The construction of guide rollers 156 is shown in FIG. 9, and each is freely rotatable in bearings carried in the side walls or frame of the machine. Bushing 157 may be removed at one end to facilitate endwise removal of the guide roller. This construction, illustrated for roller 156, is typical of the other guide rollers shown.

The window is delivered to a carton blank in proper timing to position it over the window opening. The two are squeezed together by a roller 216 (FIGS. 3 and 4), as they are rolled between the drum 74 and the roller 216. The latter is a driven roller, as will be seen in FIG. 4, and the pitch diameter of its pinion 218 is the same as the roll diameter. It meshes with a gear 220 having a pitch diameter the same as that of the drum 74, so that the roller and drum have the same linear speed. The roller 216 is urged resiliently upward by means of compression springs 222, adjustable at 224. The support spindle 210 of the transfer bar is offset from the springs 222, as will be seen in FIG. 3.

In most cases the window will transfer safely to the preglued carton blank as they pass between the drum and the drive roller 216. The blank continues in a horizontal direction because of guide bars 226 (FIG. 3) and conveyor 82, and the window moves along with the blank because of the adhesion of the glue line. Thus the transfer bar 92 is not always needed, and its use is optional, but it is provided to take care of materials which afford poor adhesion so that the transfer may not be dependable.

The lower drive roller 216 is preferably sheathed with a non-conductive material or "skin," because the charge from bar 92 is not applied directly to the film. Instead the transfer bar puts a charge into the non-conductive skin of the drive roller 216, and this charge in turn is applied to the carton, which then attracts the window away from the drum. Differently expressed, it neutralizes the charge as between the window and the drum, thereby eliminating that attraction and substituting its own. In any case, a transfer of the window to the carton is thus assured without reliance on the adhesive. Here again the bar may be put into or out of circuit, and when put into circuit its effect may be adjusted in either or both of two ways, one being a change of the spacing between the pins and the drive roller, and the other being a change in the voltage supplied to the transfer bar.

The drive of the machine may be described with reference to FIG. 5 of the drawing. A motor 300 drives a pulley 302, with multiple V belts 304 driving a pulley 306 on a shaft 308. This carries a worm or a helical gear 310 which drives a mating gear 312 to operate the glue applying mechanism. Reverting to FIG. 2, it will be recalled that this comprises primarily a glue applying cylinder 54 and a pressure roll 58. The glue mechanism may be conventional, and requires no detailed description, but in FIG. 5 the gear 312 turns a gear 58 having the same pitch diameter as the roller 58, and meshing with a gear 54' having the same pitch diameter as the glue cylinder 54. Additional rollers for transferring the adhesive to the cylinder are also driven by appropriate additional gearing.

The shaft 308 extends for the spacing between the glue applying mechanism and the window applying mechanism. At the window applying mechanism the shaft 308 carries a worm or helical gear 312 meshing with a mating gear 314 on the shaft of the lower drive roll 216 previously referred to in connection with FIGS. 3 and 4. The gear 314 turns a pinion 218 having the pitch diameter of the drive roll, and this meshes with a gear 220 having the pitch diameter of the drum 74. Gear 220 meshes with a gear 222 having the pitch diameter of the cutter drum 180. This train of gearing is better shown in FIG. 4, which has similar reference numerals.

The conveyor belt 84 (FIG. 5), which carries the windowed blanks to the stacking table, is driven by means of a roll 316, the shaft of which is turned by a chain 318 meshing with a sprocket wheel 320. This is driven by the shaft 308 through appropriate gearing housed at 322. The slope of the conveyor is adjustable at 85. The short transfer belt 82 has been omitted in FIG. 5.

The other mechanism and conveyors shown schematically in FIG. 2 similarly are driven by motor 300 (FIG. 5) and shaft 308. The parts are all related in speed, because they all handle the same box blanks.

The metering rolls 70 and 71 are also driven by motor 300, but through independent gearing which preferably combines change gears and a P.I.V. drive generally designated 330. This drive terminates in a sprocket wheel 332 driving a chain 334 meshing with a sprocket wheel 336. This in turn drives the metering rolls by means of gearing, better shown in FIG. 7 of the drawing.

It should be understood that there is no significant relation between the window metering and the carton blank speed, because in some cases a very long carton blank may receive a very short window, and in other cases the window may be nearly as long as the carton blank. The speed of the metering rolls, relative to the speed of the drive rolls which feed the carton blank, determines the length of the window material relative to the length of the carton. A wide range of variation is therefore desirable. At the window applying drum the difference in speed is made up by slippage, as previously described.

Referring to FIG. 7, the driven sprocket gear 336 drives a pinion 338 meshing with a gear 340 which drives metering roll 70. This in turn drives metering roll 71 by reason of meshing gears 70' and 71'. For convenience the sprocket gear 336 is shown in the plane of the rolls, but actually it is below, as shown in FIG. 5.

For a large change in metering roll speed a control knob 342 may be slid to the left, thereby disengaging pinion 338, and engaging gear 344 with pinion 346. This provides a much higher rate of metering. This gear change is used in conjunction with other gear changes, as is well known in change gear boxes, and in conjunction with the PIV drive shown in 330 in FIG. 5.

The pressure on the web between the metering rolls is adjustable by means of a knob 348 (FIG. 7), the adjustment of which may be locked by a locking handle 350. The adjustment comes about because the spindle portion 352 is eccentric relative to the fixed shaft 354 on which the metering roll 71 turns. There is a similar eccentricity at the end 356, and the parts 352, 354, and 356 are preferably integral. In consequence, the handle 348 may be used to change the angle of eccentricity, which in turn moves the roll 71 toward or away from the roll 70, with a gradual camming action.

An improved cutter is shown in FIGS. 13, 14, and 15. The blade 284 cooperates with a vacant slot 297. For this purpose the blade 284 is bordered on both sides by resilient material 200, as is best shown in FIG. 14, and this is so dimensioned as to be compressed against the drum 74 (or the flush inserted bar 296) on each side of the slot 297, as shown in FIG. 13. The resilient clamp material 200 may be cork, rubber, artificial rubber, or other such resilient material which is somewhat frictional. Non-resilient blocks could be used, if spring loaded to make them resilient.

With this arrangement the web or film is gripped positively and moved with the drum and knife at the instant of cutting, even though there is slippage on the drum the rest of the time. The momentary speeded up movement of the film is accommodated by the compensator roller, which now may be spring operated instead of cam operated, because the web is pulled firmly. The blade is preferably serrated, partly to provide a serrated cut, but mainly in order to more readily penetrate the film.

The present cutting arrangement avoids the need for anvils on the drum, which anvils must be fitted and meshed to the cutting blades, and which must be replaced as they wear out. In the present case the blade runs longer without sharpening, because it cuts into an open slot. A power driven or cam operated compensator roller to release or feed the web is not needed, and instead may be replaced by a simple spring operated roller as shown in FIG. 15, in which shaft 160 and compensator roller 72 correspond to the similarly numbered parts in FIG. 5. The cam follower 162 (FIG. 5), roller 164, and cam 166 (with its two companion cams) are all eliminated. Spring 163 of FIG. 5 is replaced by spring 263 of FIG. 15, which pulls the compensator roller 72 upward to its normal rest position. Elimination of the cams facilitates a change to different sized blanks with different numbers of cutting blades, because there is no need to change the cam, as well as to change the anvils.

Because cams and followers are no longer needed, the design is more economical and eliminates noise, pounding, anvils, wear, operator's set-up and maintenance time, and stocking of multiple cams. It eliminates the need for many parts and set-ups, and results in more efficient operation, while still maintaining quality.

By utilizing a drum timing adjustment shown at 219 in FIG. 4, the knife (or knives) are set to mate with the slot in the anvil, rather than adjacent to it as in FIG. 3A. A drum especially designed for this cutter could have smaller slots and no anvils at all.

The initial set-up of the knife is preferably below or within the resilient clamps 200 (FIG. 14), so that the clamps begin to hold the film before the knife cuts the film. When it does the film is taut, and piercing and cutting immediately take place, resulting in a direct and smooth cut, that is, without tearing action lengthwise of the web. As rotation continues the clamps expand back to their normal state, thus acting as strippers which insure that no film edges hang on the knife. Thus the window is released to static electricity control; the web slips again; and the spring 263 (FIG. 15) re-sets the compensator 72 for the next cut.

It is believed that the construction and operation of our improved window applying machine, as well as the advantages thereof, will be apparent from the foregoing detailed description. It will also be apparent that while we have shown and described our invention in several preferred forms, changes may be made in the structures shown without departing from the scope of the invention as sought to be defined in the following claims. In the claims the term "anvil" is not intended to exclude the construction shown in FIG. 13, in which the usual anvil is replaced by a vacant slot or channel.

We claim:

1. In the operation of a mechanism of the rotary slip and drag cutter type including a rotary window-delivering drum and a pressure roller therebeneath where the windows are delivered to and pressed against the blanks, the method of causing the windows to adhere to the drum which includes applying a high D.C. voltage to the web of window material as it approaches the drum and cutter in order to charge the window material electrostatically, and applying a D.C. voltage of opposite polarity to the web at a point further ahead of the drum in order to neutralize the web against backward travel of the electrostatic charge along the web.

2. In the operation of a mechanism of the rotary slip and drag cutter type including a rotary window-delivering drum and a pressure roller therebeneath where the windows are delivered to and pressed against the blanks, the method of causing the windows to adhere to the drum which includes applying a high D.C. voltage to the web of window material as it approaches the drum and cutter in order to charge the window material electrostatically, applying a D.C. voltage of opposite polarity to the web at a point further ahead of the drum in order to neutralize the web against backward travel of the electrostatic charge along the web, and applying another D.C. voltage of opposite polarity to the pressure roller in order to facilitate release and transfer of the window from the drum to the blank.

3. Apparatus of the slip and drag cutter type, to apply a short sheet to a long sheet, said apparatus comprising a rotating delivery drum, said drum having an anvil, cutting means cooperating with said anvil, a pressure roller beneath the drum where the short sheets are delivered to the long sheets to which they are to be adhered, means to apply a high D.C. voltage to a web of short sheet material as it approaches the drum and cutter in order to charge the material electrostatically, and means to apply a D.C. voltage of opposite polarity to the web at a point further ahead of the drum in order to neutralize the web against backward travel of the electrostatic charge along the web.

4. Apparatus of the slip and drag cutter type, to apply a short sheet to a long sheet, said apparatus comprising a rotating delivery drum, said drum having an anvil, cutting means cooperating with said anvil, a pressure roller beneath the drum where the short sheets are delivered to the long sheets to which they are to be adhered, means to apply a high D.C. voltage to a web of short sheet material as it approaches the drum and cutter in order to charge the material electrostatically, and means to apply another D.C. voltage of opposite polarity to the pressure roller in order to facilitate release and transfer of the short sheet from the drum to the blank, said means for applying a D.C. voltage comprising a bar of suitable length extending in the direction of the axis of the drum, said bar carrying pointed electrodes extending transversely of the bar, and a bus bar to which all of the electrodes are connected.

5. Apparatus of the slip and drag cutter type, to apply a short sheet to a long sheet, said apparatus comprising a rotating delivery drum, said drum having an anvil, cutting means cooperating with said anvil, a pressure roller beneath the drum where the short sheets are delivered to the long sheets to which they are to be adhered, means to apply a high D.C. voltage to a web of short sheet material as it approaches the drum and cutter in order to charge the material electrostatically, means to apply a D.C. voltage of opposite polarity to the web at a point further ahead of the drum in order to neutralize the web against backward travel of the electrostatic charge along the web, and means to apply another D.C. voltage of opposite polarity to the pressure roller in order to facilitate release and transfer of the short sheet from the drum to the blank.

6. Apparatus for feeding a sheet to a delivery station, said apparatus comprising a moving carrier, and means for applying a high D.C. voltage to the sheet at the carrier in order to charge it electrostatically so that it adheres to the carrier, said means comprising a bar of suitable length extending in a direction transverse to the direction of movement of the carrier, said bar carrying pointed electrodes extending transversely of the bar, and a bus bar to which all of the electrodes are connected.

7. Apparatus for feeding a transparent window to a blank on which it is to be adhesively secured, said apparatus comprising a rotating drum having an insulation surface, and means for applying a high D.C. voltage to the window at the drum in order to charge it electrostatically so that it adheres to the drum until it reaches the blank, said means comprising a bar of suitable length extending in the direction of the axis of the drum, said bar carrying pointed electrodes extending transversely of the bar, and a bus bar to which all of the electrodes are connected.

8. Apparatus for feeding a sheet to a delivery station, said apparatus comprising a moving carrier, and means for applying a high D.C. voltage to the sheet at the carrier in order to charge it electrostatically so that it adheres to the carrier, said means comprising a bar of suitable length extending in a direction transverse to the direction of movement of the carrier, said bar carrying pointed electrodes extending transversely of the bar, a bus bar to which all of the electrodes are connected, a resistor in series with each electrode between the bus bar and the electrode, and means mounting the bar for fixed adjustment of the spacing between the electrodes and the surface to be charged thereby.

9. Apparatus for feeding a transparent window to a blank on which it is to be adhesively secured, said apparatus comprising a rotating drum having an insulation surface, means for applying a high D.C. voltage to the window at the drum in order to charge it electrostatically so that it adheres to the drum, said means comprising a bar of suitable length extending in the direction of the axis of the drum, said bar carrying pointed electrodes extending transversely of the bar, a bus bar to which all of the electrodes are connected, a resistor in series with each electrode between the bus bar and the electrode, and means mounting the bar for fixed adjustment of the spacing between the electrodes and the surface to be charged thereby.

10. Apparatus for feeding a sheet to a delivery station, said apparatus comprising a rotating drum, means for applying a high D.C. voltage to the sheet at the drum in order to charge it electrostatically so that it adheres to the drum, and means for applying a D.C. voltage of opposite polarity at the delivery station in order to help release the sheet from the drum, said means for applying a D.C. voltage comprising a bar of suitable length extending in the direction of the axis of the drum, said bar carrying pointed electrodes extending transversely of the bar, and a bus bar to which all of the electrodes are connected.

11. Apparatus of the slip and drag cutter type, to apply a short sheet to a long sheet, said apparatus comprising a rotating delivery drum, said drum having an anvil, cutting means cooperating with said anvil, a presure roller beneath the drum where the short sheets are delivered to the long sheets to which they are to be adhered, means to apply a high D.C. voltage to a web of short sheet material as it approaches the drum and cutter in order to charge the material electrostatically, and means to apply a D.C. voltage of opposite polarity to the web at a point further ahead of the drum in order to neutralize the web against backward travel of the electrostatic charge along the web, said means to apply a D.C. voltage comprising a bar of suitable length extending in the direction of the axis of the drum, said bar carrying pointed electrodes extending transversely of the bar, and a bus bar to which all of the electrodes are connected.

12. Apparatus for feeding a sheet to a delivery station, said apparatus comprising a rotating drum, means for applying a high D.C. voltage of opposite polarity at the delivery station in order to help release the sheet from the drum, said means for applying a D.C. voltage comprising a bar of suitable length extending in the direction of the axis of the drum, said bar carrying pointed electrodes extending transversely of the bar, a bus bar to which all of the electrodes are connected, a resistor in series with each electrode, and means mounting the bar for fixed adjustment of the spacing between the electrodes and the surface to be charged thereby.

13. Apparatus of the slip and drag cutter type, to apply a short sheet to a long sheet, said apparatus comprising a rotating delivery drum, said drum having an anvil, cutting means cooperating with said anvil, a pressure roller beneath the drum where the short sheets are delivered to the long sheets to which they are to be adhered, means to apply a high D.C. voltage to a web of short sheet material as it approaches the drum and cutter in order to charge the material electrostatically, and means to apply a D.C. voltage of opposite polarity to the web at a point further ahead of the drum in order to neutralize the web against backward travel of the electrostatic charge along the web, said means for applying a D.C. voltage comprising a bar of suitable length extending in the direction of the axis of the drum, said bar carrying pointed electrodes extending transversely of the bar, a bus bar to which all of the electrodes are connected, a resistor in series with each electrode, and means mounting the bar for fixed adjustment of the spacing between the electrodes and the surface to be charged thereby.

References Cited in the file of this patent

UNITED STATES PATENTS

| | | |
|---|---|---|
| 1,916,109 | Hall et al. | June 27, 1933 |
| 2,202,496 | La Bombard | May 28, 1940 |
| 2,291,841 | Staude | Aug. 4, 1942 |
| 2,576,882 | Koole et al. | Nov. 27, 1951 |
| 2,723,604 | Fischer | Nov. 15, 1955 |
| 2,956,718 | Beverridge | Oct. 18, 1960 |